June 3, 1958        J. W. G. HANNON        2,837,451

METHOD OF MAKING ALUMINA POWDER

Filed Nov. 18, 1954        2 Sheets-Sheet 1

INVENTOR
J. W. G. HANNON

ATTY.

June 3, 1958   J. W. G. HANNON   2,837,451
METHOD OF MAKING ALUMINA POWDER
Filed Nov. 18, 1954   2 Sheets-Sheet 2

INVENTOR
J. W. G. HANNON
ATTY.

United States Patent Office 2,837,451
Patented June 3, 1958

2,837,451

METHOD OF MAKING ALUMINA POWDER

John W. G. Hannon, Washington, Pa., assignor to McIntyre Research Foundation, Toronto, Ontario, Canada Application November 18, 1954, Serial No. 469,820

4 Claims. (Cl. 148—6.3)

This invention relates to the manufacture of aluminum powder for the treatment of silicosis.

The use of an aluminum powder to depress the solubility of silica particles and thereby neutralize their fibrosis producing effects in the lungs is described in U. S. Patent No. 2,156,378 issued May 2, 1939, granted to James D. Denny and W. D. Robson, and also in co-pending application Serial No. 469,821, filed November 18, 1954.

It has been found in practice that the effects of such powder appear to vary greatly even for apparently similar powders and the results could not be precisely predicted.

It was also found that the production of the powder was very unpredictable and at times the quantity of powder produced would drop to an insignificant amount despite all efforts to maintain production, and the inefficiency so great that for certain periods of the year the plant would have to shut down.

Moreover, even during periods when the quantity of powder manufactured was satisfactory it was not found possible to consistently obtain powders which even apparently had similar physical, chemical and biological properties.

While it was discovered that there was apparently some correlation between the size of the aluminum particles and the effectiveness of the powder and that if smaller particles preferably below 1.0 micron could be produced then the powder would be more effective, the problems of achieving a smaller particle size multiplied the problems of manufacture and it has not heretofore been possible to produce any appreciable quantity of an effective small sized aluminum powder.

In addition to the difficulties of the manufacture of a small sized aluminum powder, such a powder if accidentally produced could not be effectively dispersed to take advantage of the fine particle size. It was found that the percentage of particles of such a powder which could be suspended in the air as individual particles for penetration of the air sacs of the lungs of a person to be treated was relatively small.

I have discovered that there are further factors governing the effectiveness of aluminum powder. I have discovered that the powder as manufactured and collected must comprise a specific aluminum oxide with a nucleous of metallic aluminum, the oxide being formed only from pure metallic aluminum and being free from substantial quantities of aluminum hydroxide. Additionally, I have discovered that the percentage of metallic aluminum must not be too great in such a powder or the powder becomes unstable and can form an explosive source.

It has been found that if in the manufacture of aluminum powder appreciable quantities of aluminum hydroxide are produced at the expense of the aluminum oxide and metallic aluminum the percent of metallic aluminum present in the powder is reduced but this aluminum hydroxide containing powder is capable of producing an exothermic reaction of such magnitude that it constitutes a spontaneously combustible product. If thus such an aluminum hydroxide containing powder is canned for use and exposed to the temperature of sunshine or higher heat it then becomes explosive.

On the other hand I have discovered that there is a definite relation between the effectiveness of the powder and the percentage of metallic aluminum and this percentage should be substantially as high as possible consistent with a stable powder. Further there appears to be a distinct relation between the percentage of metallic aluminum present for a given particle size and the ability of the particles to separate so they can be suspended in the atmosphere as individual particles and not as agglomerates.

I have discovered that there is a definite relationship between the percentage of metallic aluminum present in the powder produced, and the particular conditions under which the powder is produced.

It is therefore the object of the present invention to produce from pure metallic aluminum an aluminum powder comprising a specific aluminum oxide in which the percentage of free metallic aluminum can be accurately controlled. In particular, it is the object to enable such a powder to be consistently manufactured.

Again it is an important object to enable production of such a powder economically and in quantity.

It is also an important object to produce a powder which will have a fineness heretofore not possible, and further can be dispersed substantially as individual particles and not as agglomerates in order to take advantage of the fine particle size.

The invention will be more fully understood with reference to the following detailed description taken in conjunction with the accompanying drawings in which.

Figure 1:
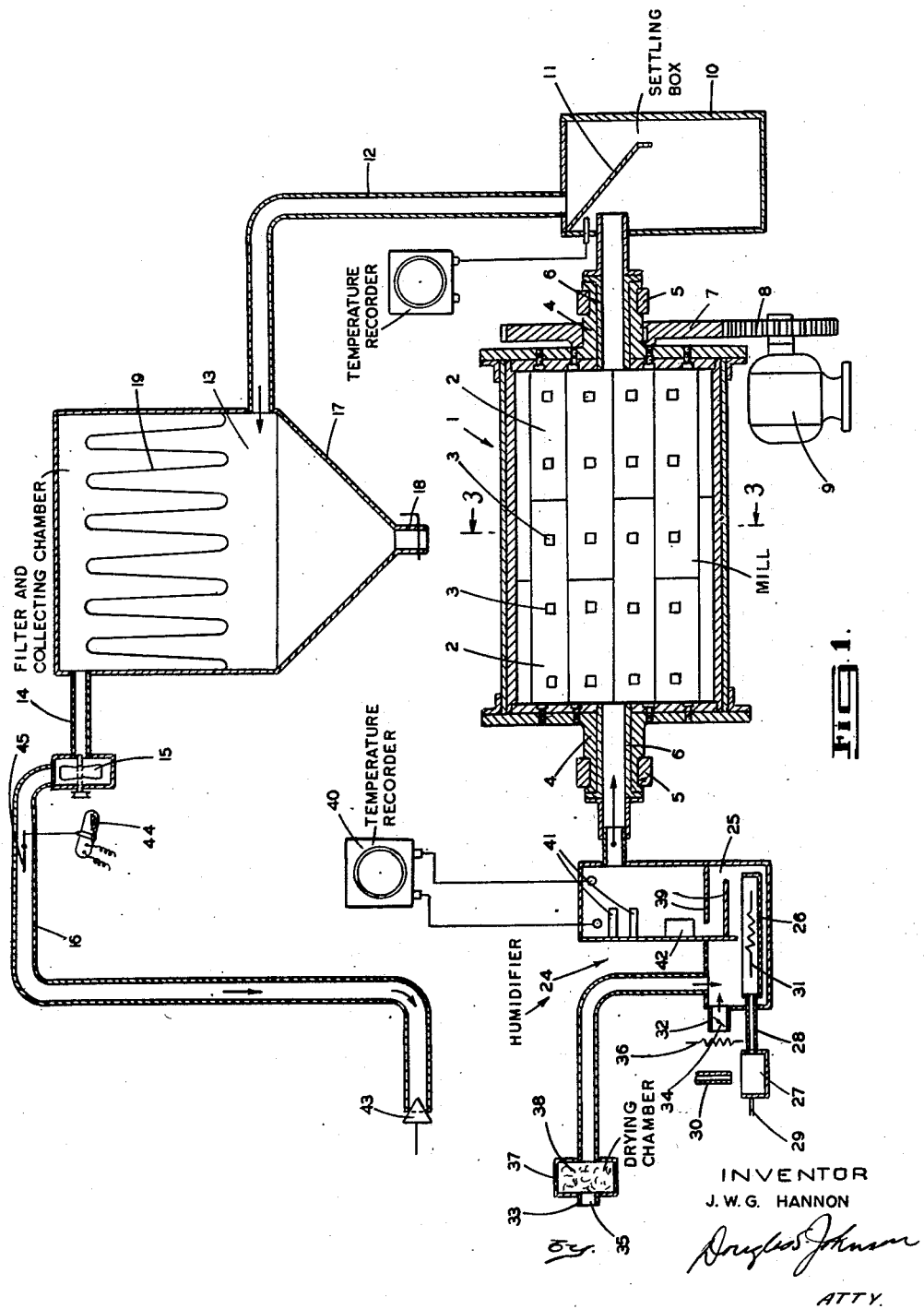
Figure 1 is a part diagrammatic and part vertical sectional view illustrating a grinding mill for carrying out the invention.
Figure 2:
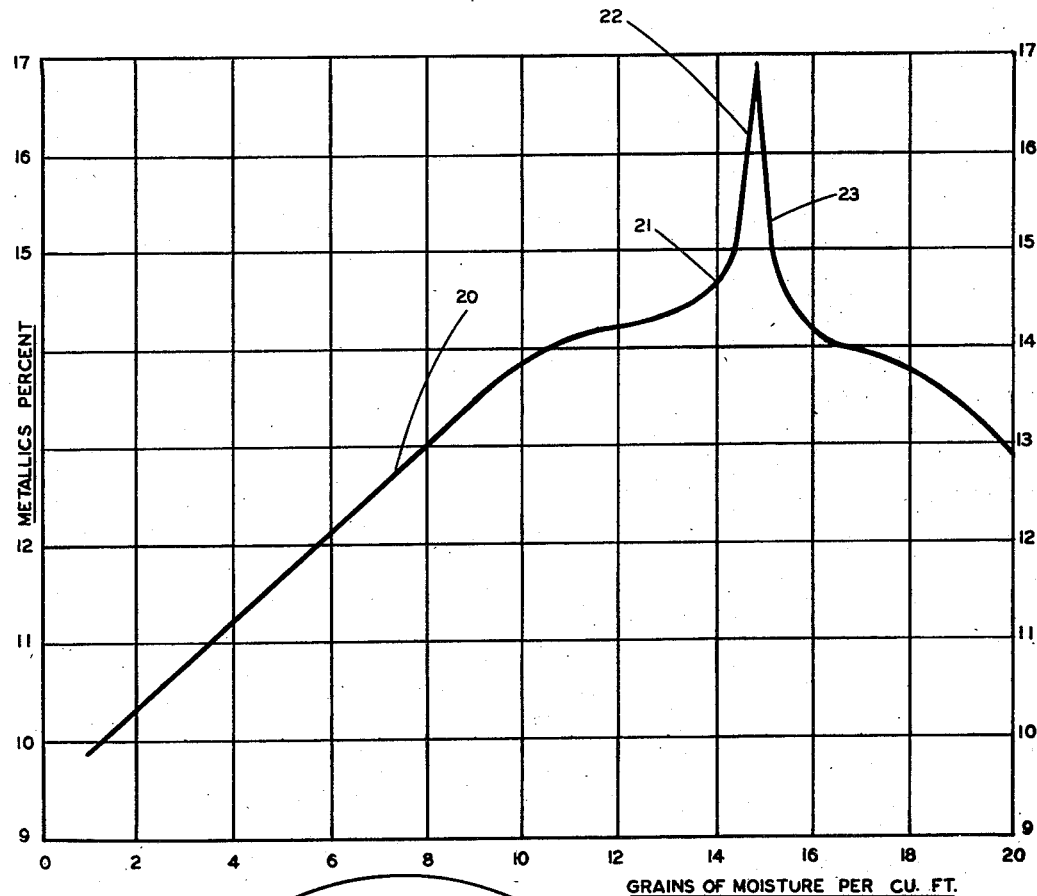
Figure 2 is a graph showing presence of metallics produced under different moisture conditions.

Referring first to Figure 1 a mill 1 for the manufacture of aluminum powder is shown as a cylindrical ball mill lined with cast aluminum liners 2 held in place by aluminum bolts 3. The mill is rotatably supported by means of hollow end journals 4 received in bearings 5. These hollow journals 4 are again lined with aluminum sleeve liners 6. At one end the mill carries a gear 7 meshing with suitable gearing 8 driven by a motor 9. The speed of the mill is maintained during grinding for the particular mill size employed having a diameter of approximately 3 ft. and a length of approximately 6 ft. at approximately 38 R. P. M.

An aluminum powder is produced by introducing into the mill small pellets of aluminum having a purity of approximately 99.9%. These pellets are ground without the aid of any steel balls or pebbles in the mill under mill rotation and the fine particles produced on grinding are carried off by an air stream into a settling box 10 provided with a baffle 11 which causes the settling out of the larger particles produced and the finer particles are conducted through a tube 12 into a chamber 13 the upper end of which has an outlet 14 in communication with a fan 15 and a discharge tube 16. The lower end of the chamber 13 is in the form of a hopper 17 having a valve control discharge spout 18. Arranged within the chamber 13 is a filter 19 comprising a large area fine mesh cloth known as a Lorna Doone cloth.

The pellets (of the order of .5 to .7 centimeter in diameter) are tumbled to provide optimum grinding at the above mill speed, and the fan 15 forms the means of drawing off the finely ground particles from the mill 1 and into the settling box 10 from which the smaller of the particles are carried to the chamber 13 where they are filtered out by the filter 19. The filter 19 may from time to time be manually or mechanically shaken to discharge the powder down through the hopper and out through the valve control discharge spout 18.

In the production of powder in such a mill it was discovered that the quantity of production of the powder varied from time to time and at intervals during the year, such a small amount of powder could be produced that it was uneconomical to maintain the mill in operation and it was shut down for extended periods.

In addition it was found that the physical and chemical properties of the powders varied so widely that the manufacture of any particular powder could not be predicted and repeated. In particular it was found that the powders produced had poor dispersion characteristics and occasionally were quite unstable and constituted an explosive source. Under examination of the various powders produced it was found that there was a very wide discrepancy in the particle size and metallic content of the powder as well as the quantities of production. While it was realized that a powder having a small particle size was highly desirable the particle size obtainable was limited so that only a relatively small proportion of the particles could be found to have a size of less than 1.0 micron. Further any particular powder that did appear to have an optimum particle size could not be subsequently reproduced.

It was discovered that control of the powder characteristics was affected by moisture conditions and that, quite independently of all air flow controls, settling chamber and filtering arrangements, powders manufactured with certain moisture conditions present gave distinctive results as far as, not only solubility depression of silica, and dispersion characteristics, but actual particle size as determined from a count of the particles on dispersal of the powder.

For instance it was discovered that a powder manufactured under precisely the same conditions in the mill including mill speed volume of air flow through the mill but in the presence of different amounts of moisture in the air would have completely divergent results. On examination of the particles of powders produced under different moisture conditions it was found that there were distinctive differences in the metallic contents of the powders and that some powders were explosive and even combustible in nature while others were not.

I conceived the idea that if the metallic content of the powder were predetermined, that by maintaining such a metallic content the properties of the powder could be predicted and could be consistently maintained. Based on this conception I found according to the present invention that, if the moisture content of the air were regulated, the metallic content and the properties of the powder could be accurately controlled.

Figure 3:
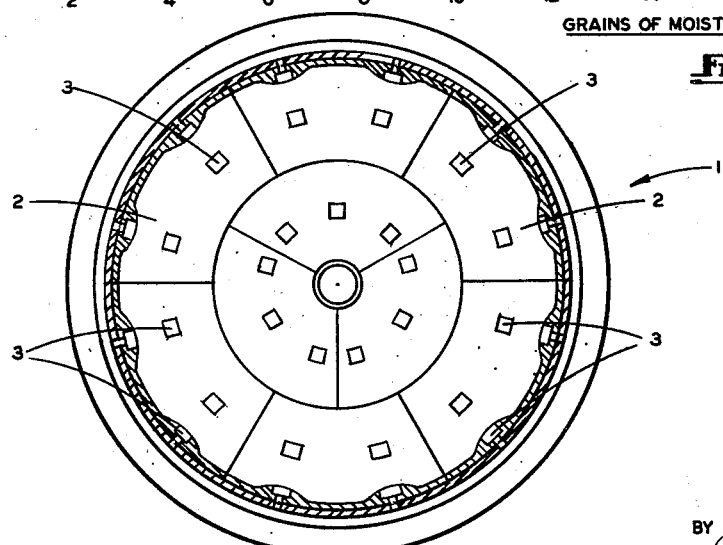
Figure 3 is a vertical sectional detail taken on the line 3—3 of Figure 1.

With reference to Figure 3 it will be seen that a plot of the grains of moisture per cubic foot of air against percent metallics of the powder produces a curve 20 which rises relatively steeply then levels off in a plateau portion 21 and has a sharp peak 22 from which it sharply falls away as at 23. By the control of the percent metallics through the control of the moisture content of the air led through the mill it was found that up to adjacent the plateau 21 the characteristics of the powder produced improved with increase in moisture. Such improvement was experienced in improved dispersion characteristics and in improved reduction of solubility as will be more particularly described with reference to the accompanying tables set forth below. As the moisture was increased to provide the peak 22 it was found that the powder was unstable and was subject to spontaneous combustion and was explosive when packaged for use. Beyond the peak 22 throughout the sharply falling portion 23 of the curve while the metallic content of the powder was reduced the increased moisture led to the production of aluminum hydroxide in a progressive chemical action and the combustible and explosive properties of the powder increased proportionally with the increase of moisture content of the air passing through the mill.

It is believed that the powder formed in the mill comprises a nucleous of aluminum surrounded initially by a specific aluminum oxide formed from the pure aluminum and if the moisture content in the mill increases beyond the peak 22 some of the oxide is converted into hydroxide increasing the particle size of the powder rendering it much less capable of suspension in the atmosphere with greatly reduced ability to depress the solubility of silica particles, and as above explained, rendering it an unstable explosive product.

On the other hand it was found that with a lower moisture content resulting in reduced percentages of metallics that it was impossible to manufacture any appreciable quantity of powder that would have a useful particle size.

In controlling the percentage of metallics present in the powder through the control of the moisture content of the air drawn through the mill according to the invention it was discovered that by a particular selection of the moisture content together with a particular air velocity and particular mill speed a powder could be produced and consistently reproduced which had optimum characteristics from the standpoint of particle size, dispersion characteristics, and solubility depression.

Another startling result which was discovered with moisture control was that the quantity of production increased with the improved powder qualities.

It was found that if the moisture content were controlled to provide a metallic content of approximately 12 to 15% for an air velocity of 7 ft. per minute that a powder having a size characteristic very much improved from any previously known powders was produced and could consistently be reproduced as a stable powder and in substantial quantities for economical manufacture. Such a powder is referred to in the tables below as HM-38 having a metallic content of approximately 13%, and it will be seen from Table No. 2 that more than 96% of the particles making up this powder are of 1.2 microns or less and 88% are of .8 micron or less.

The total metallic content of this powder HM-38 comprises approximately 58 to 60%.

The control of the moisture content of the air in the mill 1 is achieved by means of a humidifying device 24 comprising a chamber 25 containing a pan 26 into which water is led from a supply 27 through pipe 28. The supply 27 is in the form of a tank having an overflow 29 and filled from a nozzle 30. The pan 26 is heated by a series of strap heaters 31 and air is drawn through the chamber 25 by the fan 15 through damper controlled inlets 32 and 33. The respective dampers 34 and 35 may be regulated to provide the desired air flow through the inlets by either manual or automatic controls. Numeral 36 indicates a heater disposed in front of the inlet 32 to regulate the temperature of the inflowing air while a drying chamber is represented in front of the inlet 33 at 37. This drying chamber may contain a silica gell or other dehydrating material indicated at 38. The air drawn in through the inlets 32 and 33 is led over the water in the pan 26 and retained in the chamber 25 by means of baffles 39 before being conducted into the mill 1. Attached to the humidifying unit 24 is a humidity and temperature recorder 40 conveniently of the stylus recorder type. For automatic operation the humidifying device 24 may include suitable temperature responsive controls 41 and humidity controls 42, the construction and operation of which will be understood by those skilled in the art. These controls may be connected with the heaters 31 to provide automatic control of the evaporation of the water in the pan 26 to maintain a constant pre-determined moisture condition in the mill for a given air flow therethrough. The volume of air drawn through the mill and hence the velocity of air in the settling box 10 is controlled by a cone valve 43 arranged at the end of the discharge tube 16 leading from the fan 15.

For a mill of the type and capacity disclosed a consistent and particularly desirable powder is produced by introducing aluminum pellets of pure aluminum as above described into the mill to substantially half fill the mill and then rotating the mill at the speed set forth, 38 R. P. M., with the fan speed adjusted to draw a volume of air through the mill so that the velocity of the air in the settling box 10 is approximately 7 cubic feet per minute and the humidity in the mill is controlled to provide approximately 8 grains of moisture per cubic foot. The resultant product collected by the filter 19 is removed from the hopper 17 and is referred to in the tables below as powder HM-38.

In order to protect the equipment and to prevent the possibility of conditions being set up in the mill which would lead to an explosion in the mill or the production of an unstable powder, a switch mechanism 44 in the form of the mercury switch is connected to a vein 45 in the discharge tube 16 leading from the fan and is operated only when the fan is in operation to energise the electrical circuits supplying power to the mill motor 9 and the heaters 31.

With reference to Tables 1 to 4 below it will be seen that the powder HM-38 not only has the ability to provide a startling reduction in the solubility of silica as compared to the powder disclosed in the said U. S. Patent No. 2,156,378 which may be attributed to its greatly reduced size but additionally it has a very material improvement in its dispersion characteristic. Thus in practice the effectiveness of the powder HM-38 produced through the controlled production methods in accordance with the present invention has many times the effectiveness of the original powder disclosed in the said U. S. patent. Because of the dispersion characteristic and the low settling rate the particles are capable of penetrating deeply into the lungs and into the monocytes in the sacs so that they are in position to take advantage of their increased activity in reducing the silica solubility as more fully discussed in co-pending application Serial No. 469,821.

In addition to such a powder produced according to the present invention it can be assimilated in a matter of a few minutes by dispersing in the atmosphere which persons to be treated may breathe, whereas the powder produced according to the said U. S. patent required extensive exposures in order to be effective to a substantial degree.

It will be understood that the above description taken in conjunction with the particular mill illustrated is by way of example and not by way of a limitation and variations in the apparatus and particular means of control may be made within the spirit of the invention without departing from the scope of the appended claims.

APPENDIX

Table 1

CONCENTRATION OF HM-38 AND D-R POWDERS AFTER DISPERSAL

| Time after Dispersal | Concentration, p. p. cc. | |
| --- | --- | --- |
| | HM-38 [1] | D-R [2] |
| 8 Min | 49,300 | 16,000 |
| 30 Min | 38,600 | 10,700 |
| 60 Min | 28,100 | 6,200 |

[1] HM-38 is new powder produced in accordance with the present invention.
[2] D-R is optimum powder as produced according to U. S. Patent No. 2,156,378.

Table 2

SIZE DISTRIBUTION OF HM-38 AND D-R POWDERS 8 MINUTES AFTER DISPERSAL

| Size Group Mean Diameter (M) | Percentage Occurrence | | Percentage up to Max. Size of Group | |
| --- | --- | --- | --- | --- |
| | HM-38 [1] | D-R [2] | HM-38 | D-R |
| Up to 0.2 | 24.60 | 2.69 | 24.60 | 2.69 |
| 0.2 to 0.4 | 30.85 | 5.83 | 55.45 | 8.52 |
| 0.4 to 0.8 | 32.58 | 20.18 | 88.03 | 28.70 |
| 0.8 to 1.2 | 8.64 | 19.73 | 96.67 | 48.43 |
| 1.2 to 1.6 | 1.72 | 17.04 | 98.39 | 65.47 |
| 1.6 to 2.0 | 0.79 | 16.14 | 99.18 | 81.61 |
| Above 2.0 | 0.82 | | | |
| 2.0 to 2.5 | | 4.48 | | 86.09 |
| 2.5 to 3.0 | | 2.24 | | 88.33 |
| 3.0 to 4.0 | | 3.58 | | 91.91 |
| 4.0 to 5.0 | | 2.69 | | 94.60 |
| Above 5.0 | | 5.40 | | |

[1] See footnote, Table 1.
[2] See footnote, Table 1.

Table 3

SIZE DISTRIBUTION OF HM-38 AND D-R POWDERS 60 MINUTES AFTER DISPERSAL

| Size Group Mean Diameter (M) | Percentage Occurrence | | Percentage up to Max. Size of Group | |
| --- | --- | --- | --- | --- |
| | HM-38 [1] | D-R [2] | HM-38 | D-R |
| Up to 0.2 | 23.36 | 17.11 | 23.36 | 17.11 |
| 0.2 to 0.4 | 37.35 | 29.60 | 60.71 | 46.71 |
| 0.4 to 0.8 | 28.41 | 19.73 | 89.12 | 66.44 |
| 0.8 to 1.2 | 8.23 | 11.84 | 97.35 | 78.28 |
| 1.2 to 1.6 | 1.77 | 6.57 | 99.12 | 84.85 |
| 1.6 to 2.0 | 0.44 | 6.57 | 99.76 | 91.42 |
| Above 2.0 | 0.44 | | | |
| 2.0 to 2.5 | | 3.29 | | 94.71 |
| 2.5 to 3.0 | | 3.29 | | 98.00 |
| 3.0 to 4.0 | | 1.31 | | 99.31 |
| 4.0 to 5.0 | | 0.69 | | 100.00 |
| Above 5.0 | | | | |

[1] See footnote, Table 1.
[2] See footnote, Table 1.

Table 4
SOLUBILITY TABLE

| Sample | Gram | H₂O, cc. | Aluminum | P. p. m. Silica | Red., Percent |
|---|---|---|---|---|---|
| Sample I: | | | | | |
| McIntyre Mines Quartz | 1.0 | 100 | 0 | 33.2 | |
| Do | 1.0 | 100 | 10 mg. D-R [2] | 1.1 | 96 |
| Sample II: | | | | | |
| McIntyre Mines Quartz | 1.0 | 100 | 0 | 50.4 | |
| Do | 1.0 | 100 | 3 mg. HM-38 [1] | 3.5 | 93.1 |
| Do | 1.0 | 100 | 2 mg. HM-38 | 5 | 90.2 |
| Do | 1.0 | 100 | 1 mg. HM-38 | 8 | 84.1 |
| Sample III: | | | | | |
| Montreal Silica | 1.0 | 100 | 0 | 4.4 | |
| Do | 1.0 | 100 | 10 mg. D-R | 1.2 | 72.0 |
| Sample IV: | | | | | |
| Montreal Silica | 1.0 | 100 | 0 | 12.5 | |
| Do | 1.0 | 100 | 1 mg. HM-38 | 3.1 | 74.9 |
| Sample V: | | | | | |
| Montreal Silica | 1.0 | 100 | 0 | 16.1 | |
| Do | 1.0 | 100 | 1 mg. HM-38 | 4.1 | 74.2 |
| Sample VI: | | | | | |
| Flint | 1.0 | 100 | 0 | 76.7 | |
| Do | 1.0 | 100 | 3 mg. HM-38 | 8.1 | 89.4 |
| Sample VII: | | | | | |
| Flint | 1.0 | 100 | 0 | 71.7 | |
| Do | 1.0 | 100 | 1 mg. HM-38 | 12.1 | 83.1 |
| Sample VIII: | | | | | |
| Diatomaceous earth | 1.0 | 100 | 0 | 23.4 | |
| Do | 1.0 | 100 | 1 mg. HM-38 | 6.72 | 71.91 |

[1] See footnote, Table 1.
[2] See footnote, Table 1.

Where the words "aluminum powder" appear herein it is to be understood to mean a powder formed from pure aluminum.

What I claim as my invention is:

1. A method of manufacturing an aluminum oxide powder comprising grinding pure aluminum pellets while maintaining said pellets free from contact with substances other than aluminum, and, during grinding, drawing through the mill at a substantially constant uniform rate of approximately 7 feet per minute air containing a substantially constant moisture content of approximately 8 grains of moisture per cubic foot of air to draw off aluminum oxide particles produced on grinding, passing said constant moisture content air containing particles drawn off from said mill through a settling chamber to settle out larger particles drawn off and subsequently through a filtering medium to filter out smaller particles and collecting said smaller particles.

2. A method of manufacturing a finely divided powder comprising a nucleus of metallic aluminum having an oxide coating, said method comprising grinding pellets of substantially pure aluminum in a mill, directing through the mill during said grinding a stream of air having a substantially constant velocity to draw off from the mill particles produced on grinding, introducing moisture into the air stream directed through the mill to regulate the size and degree of oxide coating of the particles drawn off from the mill, settling out the larger particles drawn off from the mill in a settling chamber and collecting the remaining particles, the air flow and moisture content being so regulated that the air flow in the settling chamber is approximately 7 feet per minute, and the moisture content of the air is approximately 8 grains per cubic foot to provide in the collected particles a metallic content of approximately 12 to 15% and a particle size in which substantially all the particles collected are 1.2 microns or less, and the majority of the particles are .4 micron or less.

3. A method of manufacturing an aluminum oxide powder for use in aluminum therapy in treatment for the prevention of silicosis, comprising grinding substantially pure aluminum pellets in an aluminum lined mill to maintain said pellets out of contact with any substance other than aluminum, directing an air stream containing moisture through said mill and through a settling chamber to a collecting chamber, regulating the moisture content of said air stream directed through said mill to control the size and degree of oxidation of particles produced on grinding, said moisture content being regulated to provide approximately 8 grains of moisture per cubic foot of air to provide on grinding a substantial quantity of particles of .4 micron and less and having a metallic content of approximately 12 to 15%, and regulating the velocity of said air stream to settle out in said settling chamber substantially all particles greater than 1.2 microns, the velocity of the air stream being regulated to have a velocity through the settling chamber of approximately 7 feet per minute, and collecting the particles carried by said air stream to said collecting chamber.

4. A method of manufacturing alumina comprising grinding pellets of pure aluminum in the presence of an air stream moving at a substantially constant velocity, controlling particle size produced on grinding by introducing moisture into said air stream to provide a substantially constant moisture content of approximately 8 grains of moisture per cubic foot of air, conveying the particles formed on grinding said pellets through a settling chamber to settle out larger particles, the velocity of said air stream being such as to produce an air velocity of 7 ft. per minute through said settling chamber, and collecting the remaining particles by filtration.

References Cited in the file of this patent

UNITED STATES PATENTS

| | | |
|---|---|---|
| 1,424,608 | Woolcott | Aug. 1, 1922 |
| 1,619,295 | Gardner | Mar. 1, 1927 |
| 1,832,868 | Kramer | Nov. 24, 1931 |
| 2,060,375 | Ishimura | Nov. 19, 1936 |